March 11, 1969     R. CLAREN     3,432,610
VIBRATION DAMPERS FOR SUSPENDED MEMBERS
Filed Aug. 21, 1967

INVENTOR

RODOLFO CLAREN

BY

ATTORNEY

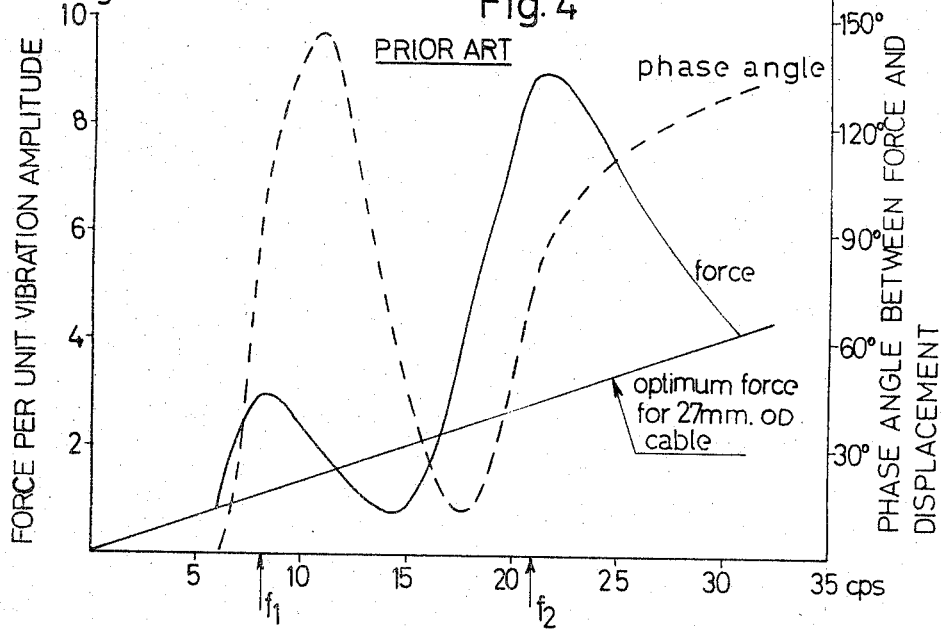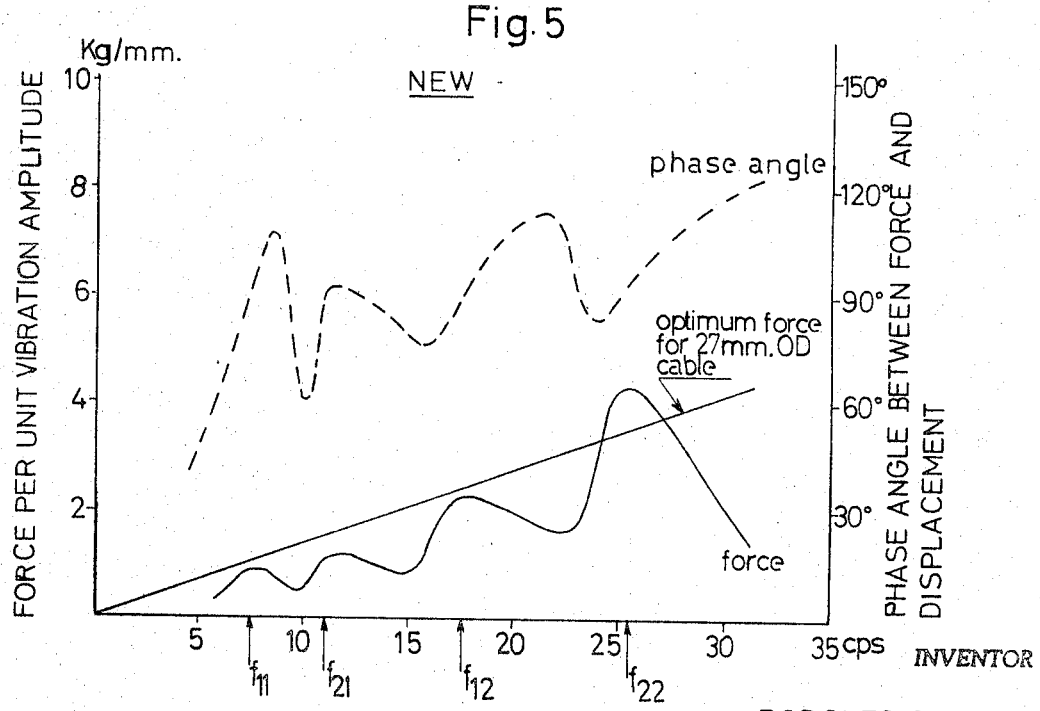

United States Patent Office 3,432,610
Patented Mar. 11, 1969

3,432,610
VIBRATION DAMPERS FOR SUSPENDED MEMBERS
Rodolfo Claren, Milan, Italy, assignor to A. Salvi & Co. S.p.A., Milan, Italy, a corporation of Italy
Filed Aug. 21, 1967, Ser. No. 661,928
Claims priority, application Italy, Jan. 14, 1967, 11,471/67
U.S. Cl. 174—42                         9 Claims
Int. Cl. H02g 7/14

ABSTRACT OF THE DISCLOSURE

An improved vibration damper is described to the conventional Stockbridge damper having a pair of inertia members secured to opposite ends of a resilient member (e.g. a length of stranded steel cable), the latter having a clamp for attaching same to a suspended elongated member (e.g. an electrical cable) subject to aeolian vibration. In the improved damper, the pair of inertia members are of a mass and of a moment of inertia substantially different from each other and are secured to the resilient member at a location such that the axial length of the resilient member for one of the inertia members is different from the axial length of the resilient member for the other inertia member. Preferably, the ratio of the masses and also of the moments of inertia with respect to the two inertia members is less than 0.875 or greater than 1.15, and the corresponding ratio of the axial length of the resilient member is less than 0.93 or greater than 1.08.

BACKGROUND OF THE INVENTION

Field of the invention

This invention relates in general to new and improved vibration dampers for protecting suspended elongate members against vibration-induced fatigue failures adjacent their points of support or suspension. The invention is more particularly addressed to dampers for minimizing and/or preventing aeolian or wind-induced vibrations in strung or suspended elongate members, such as rods, cables, wires, and the like, a specific example of which is an overhead stranded electrical transmission cable or line.

Description of the prior art

It is well recognized that suspended elongate members are vibrated by the wind and that aeolian vibrations produced therein are a frequent source of fatigue failures in the elongate members adjacent their points of support or suspension. In the case of stranded cables, failure by fatigue may involve fracture of all, or less than all, of the strands incorporated in their fabrication. The aeolian vibrations complained of exist almost entirely in a substantially vertical plane, are most devastating in the range of wind velocities from 2 to 15 miles per hour, and are caused by alternate formation of eddy currents or vortices above and below the longitudinal axis of an elongate member on the leeward side thereof.

The amplitudes of individual aeolian vibrations have been determined and observed to be relatively small and normally less than the diameters of the elongate members so vibrated. In addition, it has been observed and determined that there are many loops and node points in any given length of span of a vibrating elongate member.

The loop length, frequency and amplitude of aeolian vibrations vary over wide ranges of values for any given length of span, cross-sectional area of elongate member and tension within the suspended member, in accordance with the direction and velocity of the wind inducing the complained of vibrations. Manifestly, energy-absorbing devices, termed vibration dampers, have been devised and are in regular use in attachment on suspended elongate members, subject to aeolian vibration, for the express purpose of protecting the elongate members against fatigue failure adjacent their points of suspension.

One of the most effective and widely used dampers for preventing and/or minimizing aeolian vibrations in suspended elongate members is known commercially as the "Stockbridge" damper. This damper, as conventionally fabricated and used for more than twenty-five years, is described and illustrated in United States Letters Patent 1,992,538, issued Feb. 26, 1935. In its essentials, the conventional Stockbridge damper herein referred to consists of a pair of substantially equal inertia members, or weights, having the same mass and moment of inertia, separated by an axially extending resilient member to the opposite ends of which one each of the inertia members is secured. A single clamp secured to the resilient member, intermediate the inertia members, is adapted to attach the damper to a suspended elongate member to be protected thereby, and in operation, aeolian vibrations in the suspended elongate member are transmitted to the damper, to shake or vibrate the inertia members under the energy-absorbing restraint of the resilient member supporting the same.

Twenty-nine years of actual practice and regular use of conventional Stockbridge dampers of United States Letters Patent 1,992,538 has resulted in the necessity of providing and stocking at least twelve commercial damper sizes to satisfactorily accommodate and protect suspended electrical transmission line cables, having the approximate exterior diameter range 0.15" to 2", subject to aeolian vibration within prevailing wind velocities of 2 to 15 miles per hour. By "size of damper" is meant the total sprung weight of the two substantially equal weight inertia members, and the twelve conventional Stockbridge dampers in regular commercial use on electrical transmission line stranded conductors of the aforementioned approximate exterior diameter range of 0.15" to 2" have necessitated sprung weights falling within the range 1.5 to 20 pounds, the resilient member supporting the inertia members or weights being preferably a length of stranded steel cable.

Regardless of the highly satisfactory performance established by conventional Stockbridge dampers over the past twenty-nine years, it now develops that a better performance can be achieved by a substantial modification of the characteristics of the aforesaid conventional Stockbridge dampers.

SUMMARY OF THE INVENTION

It is an object of the present invention to provide an improved Stockbridge type damper of increased and superior damping efficiency.

Briefly, the invention provides a Stockbridge type damper which differs from its conventional predecessor or subsequent modifications in that the two individual inertia members of the damper are not substantially identical, but have different weight and different mass distribution and the distance between the attachment point to the resilient member of one inertia member to the attachment point of the connecting clamp is substantially different from the distance between the attachment point to the resilient member of the inertia member to the attachment point of the connecting clamp.

Preferably, the ratio of the mass and also of the moment of inertia, of one inertia member with respect to that of the other is less than 0.875 or greater than 1.15; and the ratio of the axial length of the resilient member for one inertia member with respect to that for the other is less than 0.93 or greater than 1.08.

Vibration dampers so constructed have been found to have improved damping efficiency characteristics, as will be more fully described below. These improved characteristics have been established by computer determinations and confirmed by laboratory span testing in an extensive analytical and test program extending over a period of several years.

In addition, the improved vibration damper permits a reduction in the number of sizes usually required for different size cables or other suspended members.

Other features and advantages of the improved dampers of the invention will be understood and readily discernible to those versed in and faced with the complex problems and behavior of vibrating structures, and fatigue failures resulting therefrom, on consideration of the following description and illustrations appended hereto.

BRIEF DESCRIPTION OF THE DRAWINGS

FIG. 4 is a typical response curve of a conventional Stockbridge damper; and

FIG. 5 is a typical response curve of an improved Stockbridge type damper made in accordance with the present invention.

DESCRIPTION OF THE PREFERRED EMBODIMENTS

Figure 1:
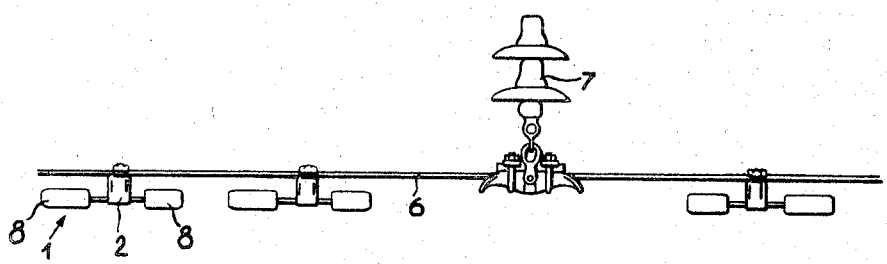
FIG. 1 is an elevational view of a portion of a span length of suspended electrical transmission line with improved dampers of the invention in attachment thereto.
Figure 2:
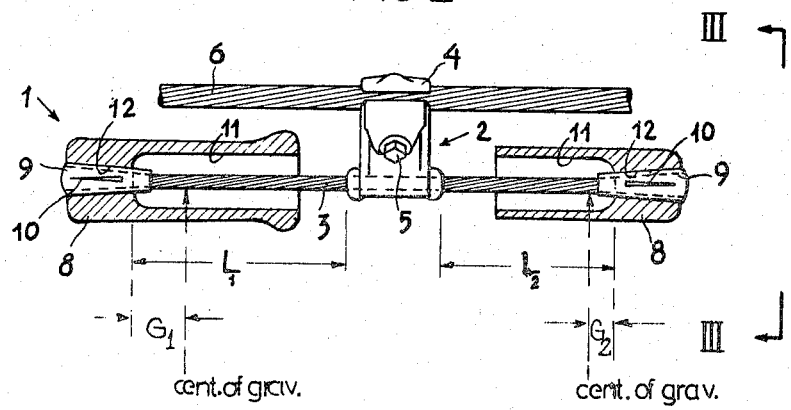
FIG. 2 is an enlarged view, partly in section, of a preferred embodiment of the damper of the invention.
Figure 3:
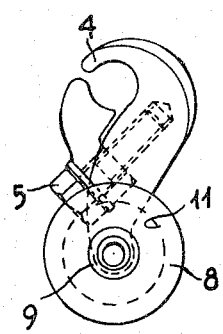
FIG. 3 is a transverse elevational view taken on the plane III—III of FIG. 2.

The program culminating in the present invention established that a conventional Stockbridge damper can be considered as composed of two substantially equal systems each composed of one resilient member and one inertia member and the total force transmitted by the damper to the suspended elongate member as a response to the vibrations of the suspended elongate member is the result of two equal forces transmitted by the two substantially equal systems. It was further established that each of the two equal systems of a conventional Stockbridge damper has the same resonance frequencies and that these resonance frequencies are two as each system is a two-degree of freedom system.

The program further established what should be the optimum force that a damper should transmit to a suspended elongate member in order to achieve the greatest overall damping performance, and that, generally, the force generated by a conventional Stockbridge damper of a size suitable for a suspended elongate member is greater than the above mentioned optimum force at the resonance frequencies or close to them and smaller than the above mentioned optimum force at the other frequencies, as it can be seen from the response curve of FIG. 4.

It was determined that a Stockbridge damper designed with two substantially different systems having different resonance frequencies improves the response as shown in FIG. 5.

More particularly, it was determined that the damping efficiency of a conventional Stockbridge damper can be improved when the masses and weights and moment of inertia of the two inertia members are not substantially identical and the clamp is not secured to the resilient member intermediate to the attachment points of the inertia members or weights, but each inertia member has a particularly and different weight or mass and moment of inertia and the clamp is secured to the resilient member in such a way that the axial length of the resilient member measured from the clamp towards the attachment point to the resilient member of one inertia member is substantially different from the axial length of the resilient member measured towards the attachment point to the resilient member of the other inertia member.

Referring to the illustrations one form of improved damper 1 of the invention comprises a cable-attaching clamp 2 compressed as by swaging or cast, or otherwise engaged on a length 3 of resilient material, such as stranded steel cable. The clamp 2 is of generally hook shape remote from its engagement on the resilient member 3 and is provided with an adjustable cooperating arm or lug 4 and securing bolt 5, for clamping attachment or affixation of the damper to a suspended elongate member 6, such as an overhead electrical transmission cable or conductor supported in spaced span lengths by insulators 7.

An inertia member or weight 8 is secured to each outboard length 3 of the resilient member. The inertia members 8 are of substantially different mass and weight, in any one size or weight of damper, and in one form of the invention each inertia member is of generally tubular bell shape to provide an axially extending outboard terminal end portion.

Connecting and securement of an inertia member 8 on opposite ends of the resilient members 3 is preferably accomplished by employing a radially compressible sleeve or collet 9, which is preferably tapered and axially split or slitted from its large end axially inwardly towards its reduced end, one or more radial slits 10 having been found desirable. The sleeve 9 is received within a slightly tapered aperture or bore 11 centrally disposed and extending over the axial length of the terminal end portion and opening into the interior tubular body portion of each inertia member 8, and is preferably provided with a tapered tip 12 extending into the tubular body portion of each inertia member.

To complete firm connection and securement of the inertia members 8 on the resilient member 3, each outboard end thereof is axially extended into the axial bore through the tip 12 and through the body of the sleeve 9 within the aperture 11 in each inertia member, and the inner surface of the sleeve 9 is thereafter radially and axially compressed into engagement with the resilient member 3 as by relative axial movement and wedging action developed between the outer tapered surface of the sleeve 9 and internal tapered surface of the aperture 11 in each of the inertia members 8.

Distribution of the mass and weight of each individual inertia members 8 in respect of the overhung axial lengths of the resilient supporting member 3 and the lengths $l_1$ and $l_2$ of the resilient supporting member 3 are a significant structural feature of the improved dampers of the invention.

If $M_1$ is the mass and $J_1$ is the moment of inertia in respect of the center of gravity of one inertia member and $M_2$ the mass and $J_2$ the moment of inertia in respect of the center of gravity of the other inertia member, and if $K_1$ is the elastic coefficient of the length $l_1$ of the resilient supporting member 3 and $K_2$ the elastic coefficient of the length $l_2$ of the resilient supporting member 3 as expressed by the following equations:

$$K_1 = \frac{3E_m J_m}{l_1^3}; \quad K_2 \frac{3E_m J_m}{l_2^3}$$

where $E_m$ is the modulus of elasticity of the resilient supporting member and $J_m$ the moment of inertia in respect of the neutral axis of the resilient supporting member, the aforesaid resonant frequencies of the two systems are approximately given by the following equations:

$$f_{11} = \frac{1}{2\pi}\sqrt{\frac{K_1}{M_1}} \quad f_{12} = \frac{1}{2\pi}\sqrt{\frac{4K_1 L_1^2}{3J_1}}$$

$$f_{21} = \frac{1}{2\pi}\sqrt{\frac{K_2}{M_2}} \quad f_{22} = \frac{1}{2\pi}\sqrt{\frac{4K_2 L_2^2}{3J_2}}$$

As previously mentioned, a conventional Stockbridge damper is characterized by having two substantially identical inertia members, and therefore having $M_1=M_2$ and $J_1=J_2$. A conventional Stockbridge damper is further characterized by having a clamp secured to the resilient member intermediate of the attachment points of the inertia members to the resilient member and therefore $L_1=L_2$ and $K_1=K_2$.

It follows that a conventional Stockbridge damper is also characterized by having $f11=f21$ and $f12=f22$, that is the damper is designed to have two only resonance frequencies.

In the improved dampers of the invention the inertia members are substantially different and therefore $M_1 \neq M_2$ and $J_1 \neq J_2$; furthermore the lengths of the resilient members are different, i.e., $L_1 \neq L_2$, and therefore $K_1 \neq K_2$. Furthermore the values of $M_1$, $M_2$, $J_1$, $J_2$, $L_1$ and $L_2$ of the improved dampers of the inventions are such to realize on the damper four different resonance frequencies, that is $f11 \neq f21 \neq f12 \neq f22$.

It has been found that improved damping efficiency is obtained when resonance frequencies are such that $$\frac{f_{11}}{f_{21}} < 0.875 \text{ or } \frac{f_{11}}{f_{21}} > 1.15$$

$$\frac{f_{12}}{f_{22}} < 0.875 \text{ or } \frac{f_{12}}{f_{22}} > 1.15$$

and therefore inertia member masses and moment of inertia and resilient member lengths are chosen in such a way that $$\frac{M_1}{M_2} < 0.875 \text{ or } \frac{M_1}{M_2} > 1.15$$

$$\frac{J_1}{J_2} < 0.875 \text{ or } \frac{J_1}{J_2} > 1.15$$

$$\frac{L_1}{L_2} < 0.93 \text{ or } \frac{L_1}{L_2} > 1.08$$

For purposes of example there is set forth below a comparison of a known Stockbridge damper (Type A) with an improved Stockbridge damper (Type B) constructed in accordance with the invention:

TYPE A (KNOWN)

Damper A–614–C, Aluminium Limited Dwg. A200, Dec. 14, 1933.

$M_1=M_2=0.314$ kg.m.$^{-1}$sec.$^2$
$J_1=J_2=17.02 \cdot 10^{-4}$ kg.m.sec.$^2$
$L_1=L_2=0.184$ m.
$f11=f21=f1=8.25$ c.p.s.
$f12=f22=f2=21$ c.p.s.
$G_1=0$; $G_2=0$

TYPE B (NEW)

$M_1=0.246$ kg.m.$^{-1}$sec.$^2$  $M_2=0.201$ kg.m.$^{-1}$sec.$^2$
$J_1=10.6 \cdot 10^{-4}$ kg.m.sec.$^2$  $J_2=5.525 \cdot 10^{-4}$ kg.m.sec.$^2$
$L_1=0.215$ m.  $L_2=0.150$ m.
$f11=7.5$ c.p.s.  $f21=11$ c.p.s.
$f12=17.5$ c.p.s.  $f22=25.3$ c.p.s.
$G_1=23 \cdot 10^{-3}$ m.  $G_2=3.10^{-3}$ m.

FIG. 4 illustrates the response curve of the known Stockbridge damper Type A above; and FIG. 5 illustrates the response curve of the improved Stockbridge damper, Type B above.

Besides improved damping efficiency, the invention allows a reduction in the number of damper sizes required to protect suspended electrical transmission line cables having the approximate exterior diameter range 0.15" to 2".

While the invention has been described with respect to preferred embodiments thereof, it will be understood that other forms could be employed without departing from the spirit or scope of the invention as defined in the following claims.

What is claimed is:

1. In a vibration damper consisting of a pair of inertia members secured to opposite ends of a resilient member, the latter having a single clamp for attaching same to a suspended elongated member subject to aeolian vibration, the improvement wherein said pair of inertia members are of a mass and of a moment of inertia substantially different from each other and are secured to said resilient member at a location such that the axial length of the resilient member for one of the inertia members, as measured from the clamp and the point of securement thereto of said inertia member, is different from the axial length, as correspondingly measured, of the resilient member for the other inertia member.

2. A vibration damper as defined in claim 1, wherein the ratio of the mass of one inertia member with respect to that of the other is less than 0.875.

3. A vibration damper as defined in claim 1, wherein the ratio of the mass of one inertia member with respect to that of the other is greater than 1.15.

4. A vibration damped as defined in claim 1, wherein the ratio of the moment of inertia of one inertia member with respect to that of the other is less than 0.875.

5. A vibration damper as defined in claim 1, wherein the ratio of the moment of inertia of one inertia member with respect to that of the other is greater than 1.15.

6. A vibration damper as defined in claim 1, wherein said axial length of the resilient member for one inertia member with respect to that for the other inertia member is less than 0.93.

7. A vibration damper as defined in claim 1, wherein said axial length of the resilient member for one inertia member with respect to that for the other is greater than 1.08.

8. A vibration damper as defined in claim 1, wherein said pair of inertia members are of a mass, are of a moment of inertia, and are secured to said resilient member at a location, such that the damper frequency response curve shows four resonance frequencies, $f11$, $f12$, $f21$ and $f22$ having the following relationships:

$$\frac{f_{11}}{f_{21}} < 0.875 \text{ and } \frac{f_{12}}{f_{22}} < 0.875$$

9. A vibration damper as defined in claim 1, wherein said pair of inertia members are of a mass, are of a moment of inertia, and are secured to said resilient member at a location, such that the damper frequency response curve shows four resonance frequencies, $f11$, $f12$, $f21$ and $f22$ having the following relationships:

$$\frac{f_{11}}{f_{21}} > 1.15 \text{ and } \frac{f_{12}}{f_{22}} > 1.15$$

References Cited

UNITED STATES PATENTS

| 3,052,747 | 9/1962 | Clark et al. | 174—42 |
| 3,327,048 | 6/1967 | Haro | 174—42 |

FOREIGN PATENTS

| 554,712 | 7/1932 | Germany. |
| 567,935 | 1/1933 | Germany. |

LARAMIE E. ASKIN, *Primary Examiner.*